United States Patent [19]
Hoffmann et al.

[11] Patent Number: 5,326,820
[45] Date of Patent: Jul. 5, 1994

[54] COATING AGENTS BASED ON HYDROXYL-CONTAINING POLYCONDENSATION AND POLYADDITION PRODUCTS AND THEIR USE

[75] Inventors: Peter Hoffmann, Senden; Werner-Alfons Jung, Ascheberg; Michael Brünnemann, Münster, all of Fed. Rep. of Germany

[73] Assignee: BASF Lacke+Farben Aktiengesellschaft, Munster, Fed. Rep. of Germany

[21] Appl. No.: 969,276

[22] PCT Filed: Jul. 24, 1991

[86] PCT No.: PCT/EP91/01379
§ 371 Date: Mar. 15, 1993
§ 102(e) Date: Mar. 15, 1993

[87] PCT Pub. No.: WO92/02590
PCT Pub. Date: Feb. 20, 1992

[30] Foreign Application Priority Data
Jul. 31, 1990 [DE] Fed. Rep. of Germany ....... 4024204

[51] Int. Cl.$^5$ .............................................. C08L 75/04
[52] U.S. Cl. ................... 525/123; 524/849; 524/875; 525/131
[58] Field of Search ............... 525/123, 131; 524/849, 524/875

[56] References Cited
FOREIGN PATENT DOCUMENTS
0036975 3/1981 European Pat. Off. .

Primary Examiner—Maurice J. Welsh
Attorney, Agent, or Firm—Anne Gerry Sabourin

[57] ABSTRACT

The present invention relates to coating agents based on hydroxyl-containing binders and isocyanate-containing crosslinking agents, in which coating agents I.) the binder comprises
  A1) 5 to 80% by weight of at least one polyester or one alkyd resin having an OH number from 0 to 200 mg of KOH/g and an acid number from 0 to 200 mg of KOH/g,
  A2) 95 to 20% by weight of at least one polyacrylate having an OH number from 30 to 250 mg of KOH/g and an acid number from 0 to 50 mg of KOH/g,
  the sum of the weight proportions of components (A1) and (A2) being in each case 100% by weight, and
II.) the binder is obtainable from
  1.) at least one polycondensation resin whose acid component comprises 5 to 100 mol % of cycloaliphatic polycarboxylic acids and/or esterifiable derivatives thereof,
  2.) at least one polyacrylate, at least some of which has been prepared in the presence of the polycondensation resin obtained in the first process step and
  3.) if desired, at least one further Polyaddition and/or one further Polycondensation resin.

18 Claims, No Drawings

COATING AGENTS BASED ON HYDROXYL-CONTAINING POLYCONDENSATION AND POLYADDITION PRODUCTS AND THEIR USE

The present invention relates to coating agents based on hydroxyl-containing polycondensation and polyaddition products, comprising
A) a hydroxyl-containing component (A) as binder,
B) at least one polyisocyanate as crosslinking agent,
C) one or more organic solvents,
D) if desired, conventional auxiliaries and additives, in which components (A) and (B) are present in such amounts that the ratio of the number of free OH groups of component (A) to the number of isocyanate groups of component (B) is in the range from 1:3 to 3:1.

The invention furthermore relates to processes for the preparation of these coating agents and to the use of the coating agents in automotive refinishing, in particular as clearcoat.

Coating agents based on a combination of a polycondensation resin and a polyaddition resin are known.

Thus, in German Patent 2,806,497, clearcoats for multilayer coatings are described comprising a mixture of a hydroxyl-containing polyester and a hydroxyl-containing acrylate resin as the binder. The clearcoats contain an amino resin as the crosslinking agent. The use of aliphatic and/or cycloaliphatic polycarboxylic acids and aliphatic and/or cycloaliphatic polyols in the preparation of the polyesters gives clearcoats which, compared with clearcoats based on binders containing aromatic building blocks, have improved weathering resistance. However, these clearcoats described in German Patent 2,806,497 are in need of improvement with respect to drying capacity and processibility.

Furthermore, many product information sheets from Eastman Kodak on cyclohexanedicarboxylic acid have disclosed that the use of cyclohexanedicarboxylic acid as the acid component in polyesters which are used as binders in paints, results in good stability of gloss and crack resistance of the resulting coatings. However, coating agents based on polyesters containing cyclohexanedicarboxylic acid have the disadvantage that while having good drying capacity, they nevertheless have at the same time only a very limited pot life, i.e. processing time.

Furthermore, the product information sheet from Bayer AG on Desmophen ®A 365 has disclosed air-drying automotive repair coatings which contain a hydroxyl-containing binder (Desmophen ® A 365) as the binder and polyisocyanates, such as, for example, Desmodur ® N 3390 and Desmodur ® N 75, as the crosslinking agent. The coatings obtained are distinguished by a good stability of gloss and by high light stability and chalking resistance. However, their disadvantage is the extremely short pot life of the coating compositions.

Furthermore, German Offenlegungsschrift 3,806,641 has disclosed coating compositions which contain a mixture of a carboxyl-containing polyester and a carboxyl-containing acrylate resin as the binder. Epoxy resins are used in these coating compositions as the crosslinking agent.

Finally, it is known to improve the compatibility of the individual components of binder mixtures by carrying out the synthesis of one component in the presence of the other component.

Accordingly, the present invention is based on the object of providing coating compositions based on polycondensate resins and polyaddition resins which show rapid drying and simultaneously have a long pot life, i.e. can be processed in the ready-to-use state over a long period of time. Furthermore, it is desired that the coating compositions are cured at room temperature or slightly elevated temperature, thus enabling them to be used in automotive refinishing. Furthermore, they should at least fulfil the demands usually made on a clearcoat and possibly have improved mechanical properties compared with conventional clearcoats. Thus, the coating compositions should exhibit, for example, good stability of gloss, crack resistance, filling power and good flow properties.

Surprisingly, this object is achieved by coating agents based on hydroxyl-containing polycondensation and polyaddition products, comprising
A) a hydroxyl-containing component (A) as binder,
B) at least one polyisocyanate as crosslinking agent,
C) one or more organic solvents,
D) if desired, customary auxiliaries and additives, in which components (A) and (B) are present in such amounts that the ratio of the number of free OH groups of component (A) to the number of isocyanate groups of component (B) is in the range from 1:3 to 3:1.

In the coating agents,
I.) component (A) comprises
   A1) 5 to 80% by weight of at least one polyester and/or one alkyd resin (A1) having an OH number from 0 to 200 mg of KOH/g and an acid number from 0 to 200 mg of KOH/g and
   A2) 95 to 20% by weight of at least one polyacrylate (A2) having an OH number from 30 to 250 mg of KOH/g and an acid number from 0 to 50 mg of KOH/g,
   the sum of the weight proportions of components (A1) and (A2) being in each case 100% by weight and
II.) component (A) is obtainable from
1.) at least one polyester and/or one alkyd resin (A1), which is obtainable by reaction of
   a) polycarboxylic acids and/or esterifiable derivatives thereof and, if desired, monocarboxylic acids, 5 to 100 mol % of this carboxylic acid component being cycloaliphatic polycarboxylic acids and/or esterifiable derivatives thereof,
   b) polyols, if desired together with monools,
   c) if desired, further modifying components, and
   d) if desired, a component capable of reacting with the reaction product from a), b) and, if desired, c),
2.) at least one polyacrylate (A2), at least some of which has been prepared in the presence of the component (A1) obtained in the first process step, and
3.) if desired, at least one further polyaddition and-/or one further polycondensation resin.

The invention furthermore relates to processes for the preparation of these coating agents and to their use in automotive refinishing, in particular as clear-coat. In what follows, first the individual components of the coating agents according to the invention are now illustrated in more detail. The hydroxyl-containing component (A) of the coating agents according to the invention used as binder comprises A1) 5 to 80% by weight, preferably 40 to 60% by weight, of at least one polyester and/or one alky[sic] resin (A1) and A2) 95 to 20% by weight, preferably 60 to 40% by weight, of at least one polyacrylate (A2), the sum of the weight proportions of components (A1) and (A2) being in each case 100% by weight. The polyesters or alkyd resins used as component (A1) have OH numbers from 0 to 200 mg of KOH/g, preferably 30 to 150 mg of KOH/g and acid numbers from 0 to 200 mg of KOH/g, preferably 5 to 50 mg of KOH/g. The number-average molecular weights of these polyesters or alkyd resins are usually between 500 and 10,000, preferably between 1000 and 5000, in each case measured by GPC against a polystyrene standard. The polyesters or alkyd resins can, if desired, contain tertiary amino groups.

These polyesters or alkyd resins (A1) are obtainable by reaction of a) polycarboxylic acids or esterifiable derivatives thereof, if desired together with monocarboxylic acids, b) polyols, if desired together with monools, c) if desired, further modifying components and d) if desired, a component capable of reacting with the reaction product from a), b) and, if desired, c).

Carboxylic acid component a) used for preparing the polyesters or alkyd resins (A1) comprises 5 to 100 mol %, preferably 30 to 100 mol %, and particularly preferably 50 to 100 mol %, in each case relative to the total amount of component a), of cycloaliphatic polycarboxylic acids and/or esterifiable derivatives thereof.

Examples of suitable cycloaliphatic polycarboxylic acids are tetrahydrophthalic acid, hexahydrophthalic acid, 1,2-cyclohexanedicarboxylic acid, 1,3-cyclohexanedicarboxylic acid, 1,4-cyclohexanedicarboxylic acid, 4-methylhexahydrophthalic acid, endomethylenetetrahydrophthalic acid, tricyclodecanedicarboxylic acid, endoethylenehexahydrophthalic acid, camphoric acid, cyclohexanetetracarboxylic acid and cyclobutanetetracarboxylic acid. Preference is given to the use of 1,4-cyclohexanedicarboxylic acid, tetrahydrophthalic acid, hexahydrophthalic acid and alkyl-substituted derivatives thereof and particular preference to the use of 1,4-cyclohexanedicarboxylic acid.

The cycloaliphatic polycarboxylic acids can be used not only in their cis but also in their trans form and as a mixture of both forms.

Examples of suitable polycarboxylic acids, which, if desired, can be used together with the cycloaliphatic polycarboxylic acids, are aromatic and aliphatic polycarboxylic acids, such as, for example, phthalic acid, isophthalic acid, terephthalic acid, halogenophthalic acids, such as tetrachloro- or tetrabromophthalic acid, adipic acid, glutaric acid, azelaic acid, sebacic acid, fumaric acid, maleic acid, trimellitic acid, pyromellitic acid, and the like.

Esterifiable derivatives of the abovementioned polycarboxylic acids, such as, for example, mono- or polyesters thereof with aliphatic alcohols having 1 to 4 C atoms or hydroxyalcohols having 1 to 4 C atoms are also suitable. Moreover, the anhydrides of the abovementioned acids can also be used, if they exist.

If desired, monocarboxylic acids, such as, for example, benzoic acid, tert.-butylbenzoic acid, lauric acid, isononanoic acid and fatty acids of naturally occurring oils, can also be used together with the polycarboxylic acids. The preferably used monocarboxylic acid is isononanoic acid.

Suitable alcohol components b) for preparing the polyester or alkyd resin (A1) are polyhydric alcohols, such as ethylene glycol, propanediols, butanediols, hexanediols, neopentylglycol, diethylene glycol, cyclohexanediol, cyclohexanedimethanol, trimethylpentanediol, ethylbutylpropanediol, ditrimethylolpropane, trimethylolethane, trimethylolpropane, glycerol, pentaerythritol, dipentaerythritol, tris(hydroxyethyl) isocyanate, polyethylene glycol, polypropylene glycol, if desired together with monohydric alcohols, such as, for example, butanol, octanol, lauryl alcohol, ethoxylated or propoxylated phenols.

Suitable components c) for preparing the polyesters or alkyd resins (A1) are in particular compounds having a group which is reactive toward the functional groups of the polyester, with the exception of the compounds mentioned as component d). Preferably used modifying components c) are polyisocyanates and/or diepoxy compounds, if desired also monoisocyanates and/or monoepoxy compounds.

Examples of suitable polyisocyanates are toluylene diisocyanates, hexamethylene diisocyanate and isophorone diisocyanate. Diepoxy compounds are understood to mean epoxy resins having on average about two epoxy groups per molecule. Examples of suitable monoepoxy compounds are olefin oxides, such as octylene oxide, butyl glycidyl ether, allyl glycidyl ether, phenyl glycidyl ether, p-butylphenol [sic] glycidyl ether, cresyl glycidyl ether, styrene oxide, glycidyl methacrylate, cyclohexanevinyl monoxide [sic], dipentene monoxide, α-pinene oxide and glycidyl esters of tertiary carboxylic acids.

Suitable components d) for preparing the polyesters or alkyd resins (A1) are compounds which, apart from a group reactive toward the functional groups of polyester (A1), additionally contain a tertiary amino group.

Monoisocyanates having at least one tertiary amino group are preferably used as components d) reactive with the reaction product from a), b) and, if desired, c). These can be prepared, for example, by reacting suitable diisocyanates, such as isophorone diisocyanate, with amino alcohols having a tertiary amino group, such as, for example, hydroxyethylpyridine or dimethylaminoethanol, or with polyamines having at least one tertiary and at least one secondary or primary amino group. The monoisocyanates are bonded to the binder system by reaction with free hydroxyl groups of the polycondensation and/or addition product with the formation of a urethane bond. The components d) used can also be polyamines having at least one tertiary and at least one primary or secondary amino group. An example of these is dimethylaminopropylmethylamine.

If the polyester or alkyd resin (A1) contains ethylenically unsaturated double bonds, which are preferably introduced by using ethylenically unsaturated components a) and/or b), it is also possible to use mercapto compounds having at least one tertiary amino group as component d).

In this case, the component a) used is, for example, maleic anhydride or unsaturated fatty acids; an example of an unsaturated alcohol suitable as component b) is 1,4-butenediol. In this case, the mercapto groups of the aminothiol having a tertiary amino group undergo an addition reaction with the double bonds introduced into the binder via component a) and/or b).

Apart from using component d) (polymer-analogous reaction), the tertiary amino groups can also be introduced into the polyester or the alkyd resin (A1) by using amino-containing polyols and/or polycarboxylic acids.

Aminocarboxylic acids having at least one tertiary amino group can be used, for example, together with the cycloaliphatic and, if desired, further polycarboxylic acids, as component a). Examples of these are pyridine-2-carboxylic acid, pyridine-3-carboxylic acid, pyridine-4-carboxylic acid and pyridine-2,6-dicarboxylic acid. Furthermore, the reaction product of an amino alcohol with at least one tertiary amino group and a polycarboxylic anhydride and the reaction product of a polyamine having at least one tertiary and at least one primary or secondary amino group and a polycarboxylic anhydride can be used.

Amino alcohols having at least one tertiary amino group can be used as alcohol component b). Examples of these are 2-hydroxyethylpyridine, dimethylaminopropanol, methyldiethanolamine, methyldipropanolamine and dihydroxyethylaniline. Reaction products of epoxy resins with carboxylic acids and/or amines can also be used as alcohol component b).

Thus, the reaction product of low-molecular-weight epoxy resins with polycarboxylic acids and/or polycarboxylic anhydrides and aminocarboxylic acids having at least one tertiary amino group, which is then, if desired, esterified with the acid and the alcohol component and, if desired, modified with polyisocyanates, can be used as alcohol component b). Low-molecular-weight epoxy resins are understood to mean epoxy resins having a molecular weight of less than about 2000. When epoxy resins are used, types which are low in chlorine should be used, since otherwise strong discoloration of the products can take place.

Polyesters (A1) are prepared by the known methods of esterification (cf. various standard works, such as, for example:

1. Temple C. Patton, Alkyd Resin Technology, Interscience Publishers John Wiley & Sons, New York, London 1962;
2. Dr. Johannes Scheiber, Chemie und Technologie der künstlichen Harze (Chemistry and Technology of Synthetic Resins), Wissenschaftliche Verlagsgesellschaft mbH, Stuttgart, 1943;
3. Hans Wagner+Hans-Friedrich Sarx, Lackkunstharze (Synthetic Coating Resins), 4th edition, Carl Hanser Verlag, Munich, 1959;
4. Ullmanns Encyklopädie der technischen Chemie (Ullmanns Encyclopedia of Industrial Chemistry), volume 14, pages 80 to 106 (1963)).

This reaction is usually carried out at temperatures between 180° and 280° C., if desired in the presence of a suitable esterification catalyst, such as, for example, lithium octoate, dibutyltin oxide, dibutyltin dilaurate, para-toluenesulfonic acid, and the like.

The preparation of the polyesters or alkyd resins (A1) is usually carried out in the presence of small amounts of a suitable solvent as entrainer. Examples of entrainers which are used are aromatic hydrocarbons, such as, in particular, xylene and (cyclo)aliphatic hydrocarbons, for example cyclohexane.

The polyacrylates used in the coating agents according to the invention as component (A2) have OH numbers from 30 to 250 mg of KOH/g, preferably 50 to 180 mg of KOH/g and acid numbers from 0 to 50 mg of KOH/g, preferably 5 to 20 mg of KOH/g. The number-average molecular weights of the polyaddition resins are usually between 1000 and 10,000, preferably between 1500 and 6000, measured in each case by GPC against polystyrene standard. If desired, these polyaddition resins can contain tertiary amino groups.

It is essential to the invention that at least some of the polyaddition resin (A1) has been prepared in the presence of polycondensation resin (A1). Advantageously, at least 20% by weight and particularly advantageously 40 to 80% by weight, of component (A2) are prepared in the presence of component (A1).

Any residual amount of component (A2) is then added to the binder solution or the coating agent. This already polymerized resin can have the same monomer composition as the polyaddition resin synthesized in the presence of the polycondensation resin. However, it is also possible to add a hydroxyl-containing polyaddition and/or polycondensation resin having a different monomer composition. Furthermore, it is possible to add a mixture of different polyaddition resins and/or polycondensation resins, one resin of which may have the same monomer composition as the polyaddition resin synthesized in the presence of the polycondensation resin.

The hydroxyl groups are introduced into the polyaddition resin (A2) by using hydroxyl-containing monomers. 20 to 60% by weight, preferably 25 to 45% by weight, in each case relative to the total weight of the monomers used, of at least one hydroxyl-containing ethylenically unsaturated monomer (component p1) are usually used.

Suitable components p1) are hydroxyalkyl esters of $\alpha,\beta$-unsaturated carboxylic acids having primary or secondary hydroxyl groups. If a high reactivity of the acrylate copolymer is desired, it is possible to use exclusively hydroxyalkyl esters having primary hydroxyl groups; if a less reactive polyacrylate is desired, it is possible to use exclusively hydroxyalkyl esters having secondary hydroxyl groups. It is of course also possible to use mixtures of hydroxyalkyl esters having primary hxydroxyl groups and hydroxyalkyl esters having secondary hydroxyl groups. Examples of suitable hydroxyalkyl esters of $\alpha,\beta$-unsaturated carboxylic acids having primary hydroxyl groups are hydroxyethyl acrylate, hydroxypropyl acrylate, hydroxybutyl acrylate, hydroxyamyl acrylate, hydroxyhexyl acrylate, hydroxyoctyl acrylate and the corresponding methacrylates. Examples of usable hydroxyalkyl esters having a secondary hydroxyl group are 2-hydroxypropyl acrylate, 2-hydroxybutyl acrylate, 3-hydroxybutyl acrylate and the corresponding methacrylates. It is of course also possible to use in each case the corresponding esters of other $\alpha,\beta$-unsaturated carboxylic acids, such as, for example, of crotonic acid and isocrotonic acid.

At least some of the component p1) can advantageously be a reaction product of one mol of hydroxyethyl acrylate and/or hydroxyethyl methacrylate with on average two mol of $\epsilon$-caprolactone. At least some of the component P1) used can also be a reaction product of acrylic acid and/or methacrylic acid with the equivalent amount of a glycidyl ester of a carboxylic acid having a tertiary $\alpha$-carbon atom. Glycidyl esters of highly branched monocarboxylic acids are available under the trade name "Cardura". The reaction of acrylic acid or methacrylic acid with the glycidyl ester of a carboxylic acid having a tertiary $\alpha$-carbon atom can take place before, during or after the polymerization reaction. Care should be taken that the acid number of the finished polyacrylate is in the range from 5 to 30 mg of KOH/g, preferably 8 to 25 mg of KOH/g.

To prepare the polyaddition resins (A2), in general 0 to 30% by weight, preferably 5 to 20% by weight, in each case relative to the total weight of the monomers used, of at least one vinyl ester of monocarboxylic acids (components $p_2$) are additionally used. Preferred components $p_2$) are vinyl esters of monocarboxylic acids branched in the α-position and having 5 to 15 C atoms per molecule. The branched monocarboxylic acids can be obtained by reaction of formic acid or carbon monoxide and water with olefins in the presence of a liquid, strongly acidic catalyst; the olefins can be cracking products of paraffinic hydrocarbons, such as mineral oil fractions and can contain both branched and straight-chain acyclic and/or cycloaliphatic olefins. The reaction of olefins of this type with formic acid or with carbon monoxide and water gives a mixture of carboxylic acids in which the carboxyl groups are predominantly on a quaternary carbon atom.

Examples of other olefinic starting materials are propylene trimer, propylene tetramer and diisobutylene. The vinyl esters can also be prepared in a manner known per se from the acids, for example by reacting the acids with acetylene.

Because of the ready accessibility, particular preference is given to vinyl esters of saturated aliphatic monocarboxylic acids having 9–11 C atoms which are branched at the α-C atom.

Furthermore, the vinyl ester of p-tertiary-butylbenzoic acid is particularly preferred. Examples of further suitable vinyl esters are vinyl acetate and vinyl propionate.

To prepare the polyaddition resins (A2), 10 to 80% by weight, preferably up to 60% by weight, in each case relative to the total weight of the monomers used, of at least one vinylaromatic compound (component $p_3$) are usually additionally used. Component $p_3$) preferably contains 8 to 9 carbon atoms per molecule. Examples of suitable compounds are styrene, vinyltoluenes, α-methylstyrene, chlorostyrenes, o-, m- or p-methylstyrene, 2,5-dimethylstyrene, p-methoxystyrene, p-tert.-butylstyrene, p-dimethylaminostyrene, p-acetamidostyrene and m-vinylphenol. Preference is given to the use of vinyltoluenes and in particular styrene.

To synthesize the hydroxyl-containing copolymer (A2), it is furthermore possible to use 0 to 35% by weight of other, ethylenically unsaturated, copolymerizable monomers (component $p_4$). The selection of the monomers is not particularly critical. However, care must be taken that incorporation of these monomers does not lead to undesirable properties of the copolymer. Thus, the selection of component $p_4$) largely depends on the desired properties of the curable composition with respect to elasticity, hardness, compatibility and polarity. Alkyl esters of olefinically unsaturated carboxylic acids are preferably used as component $p_4$). Examples of these are methyl (meth)acrylate, ethyl (meth) acrylate, butyl (meth)acrylate, isopropyl (meth)acrylate, isobutyl (meth)acrylate, pentyl ( meth ) acrylate, isoamyl (meth)acrylate, hexyl (meth)acrylate, cyclohexyl (meth)acrylate, 2-ethylhexyl (meth)acrylate, octyl (meth)acrylate, 3,5,5-trimethylhexyl (meth)acrylate, decyl (meth)acrylate, dodecyl (meth)acrylate, hexadecyl (meth)acrylate, octadecyl (meth)acrylate, octadecenyl (meth)acrylate and the corresponding esters of maleic, crotonic, isocrotonic, vinylacetic and itaconic acid.

Furthermore, other ethylenically unsaturated compounds, such as, for example, alkoxyethyl acrylates, aryloxyethyl acrylates and the corresponding methacrylates, such as, for example, butoxyethyl (meth)acrylate and phenoxyethyl (meth)acrylate are suitable as component $p_4$). To improve compatibility, it is also possible to incorporate small amounts of carboxyl-containing monomers by polymerization as component $p_4$). Examples of suitable carboxyl-containing monomers are unsaturated carboxylic acids, such as, for example, acrylic acid, methacrylic acid, itaconic acid, crotonic acid and monoesters of maleic and fumaric acid and mixtures thereof. By using unsaturated compounds having tertiary amino groups as component $p_4$), it is possible to incorporate tertiary amino groups in copolymer (A2). Examples of suitable monomers are N,N'-diethylaminopropylmethacrylamide [sic], N,N'-diethylaminoethyl methacrylate [sic], 2-vinylpyridine, 4-vinylpyridine, vinylpyrroline, vinylquinoline, vinylisoquinoline, N,N'-dimethylaminoethyl [sic] vinyl ether and 2-methyl-5-vinylpyridine.

The polymerization of monomer components $p_1$) to $p_4$) is preferably carried out with the exclusion of oxygen, for example by working in a nitrogen atmosphere. The reactor is equipped with suitable stirring, heating and cooling devices and with a reflux condenser, in which volatile components, such as, for example, stryene, are retained. The polymerization reaction is carried out at temperatures from 100° to 180° C., preferably 130°–170° C., with the use of suitable polymerization initiators and, if desired, polymerization regulators.

In particular, initiators containing tert.-butyl groups, such as, for example, di-tert.-butyl peroxide, tert.-butyl hydroperoxide, 2,2-di-tert.-butylperoxybutane and 1,3-bis(tert.-butylperoxyisopropyl)benzene, and dibenzoyl peroxide are suitable for preparing the polyaddition resins (A2) in the presence of polycondensation resins (A1). These initiators promote a grafting reaction of the acrylate copolymer onto the polyester. Apart from these abovementioned initiators, the initiators usually used, such as, for example, dicumyl peroxide, cumyl hydroperoxide, tert.-amyl perbenzoate, tert.-amyl 2-ethylperhexanoate, diacyl peroxides, such as, for example, diacetyl peroxide, peroxyketals, 2,2-di(tert.-amylperoxy)propane, ethyl 3,3-di(tert.-amylperoxy)butyrate and thermolabile highly substituted ethane derivatives, for example based on silyl-substituted ethane derivatives and based on benzopinacole, are also [lacuna] for the preparation of the polyaddition resins (A2) which are not prepared in the presence of the polycondensation resins (A1). Furthermore, aliphatic azo compounds, such as, for example, azoisovaleronitrile and azobis(cyclohexanenitrile), can also be used.

The amount of initiator is in most cases 0.1 to 8% by weight, relative to the amount of monomer to be processed, but it can, if desired, also be higher. The initiator, which is dissolved in a portion of the solvent used for the polymerization is gradually metered in during polymerization reaction. Preferably, the initiator feed takes about 0.5 to 2 hours longer than the monomer feed, so as to obtain a good effect also during the after-polymerization phase. If initiators having only a small rate of decay are used under the reaction conditions present, it is also possible to initially introduce the initiator.

If desired, the polymerization can be carried out in the presence of a regulator. Suitable regulators are preferably mercapto compounds, mercaptoethanol being used particularly preferably. Examples of other possible regulators are alkanethiols, such as, for example, t-dodecanethiol, octanethiol, thiophenol, octadecanethiol, butanethiol, 2-ethylhexyl thioglycolate, thiocarboxylic acids, such as, for example, thioacetic acid or thiolactic acid. These regulators are used in an amount of up to 2% by weight, relative to the amount of monomer to be processed. Preferably, they are dissolved in one of the monomer feeds and added together with the monomers. The amount of regulator added is preferably constant with time.

The polymerization is preferably carried out in a high-boiling, organic solvent which is inert toward the momoners used. Examples of suitable solvents are higher substituted aromatics, such as, for example, solvent naphtha, heavy benzene, various Solvesso ® types, various Shellsol ® types and Deasol ® and higher-boiling aliphatic and cycloaliphatic hydrocarbons, such as, for example, various white spirits, mineral terpentine oil, tetralin and decalin and various esters, such as, for example, ethylglycol acetate, butylglycol acetate, ethyldiglycol acetate, and the like. If the monomers used for preparing polyaddition resins (A2) are vinyl esters of monocarboxylic acids (component $p_2$), copolymerization of components $p_1$) to $p_4$) is preferably carried out as follows, such as also described in EP-A 349,818:

First, at least 60% by weight, preferably 100% by weight, of the total amount of component $p_2$) to be used are initially introduced into the reactor together with a portion of the total amount of solvent to be used and heated to the particular reaction temperature. The remaining amount of solvent is, as already described, preferably added gradually together with the catalyst. Any residual amount of component $p_2$) still present and the remaining monomers (components $p_1$), $p_3$) and $p_4$)) are metered in to the initially introduced component $p_2$) over a monomer addition period which is the same for all components (it is in general 2–10 h, as is customary for acrylate copolymerizations) in the following manner:

i) The amount added per time unit of any component $p_2$) still present (i.e. the residual amount of component $p_2$) which was not initially introduced) remains constant or decreases over the monomer addition period, the latter process variant being preferred. In the case of a constant amount being added, component $p_2$) is preferably metered in together with components $p_1$) and $p_4$).

ii) The amount of components $p_1$) and $p_4$) added per time unit remains constant within the monomer addition period.

iii) The amount of component $p_3$) added per time unit is varied within the monomer addition period such that the total amount added of component $p_3$) within the first third of the monomer addition period is 15 to 30% by weight, preferably 18 to 26% by weight, of the total amount of component $p_3$). Within the second third of the monomer addition period, a total of 25 to 40% by weight, preferably 30 to 38% by weight, and within the last third of the monomer addition period 35 to 60% by weight, preferably 40 to 50% by weight, of the total amount of component $p_3$) are metered in, the sum of the amounts added in the first, second and third third being of course 100% by weight.

There are various possibilities of varying the amount of component $p_3$) added per time unit, the only critical factor being that the above-mentioned total amounts added in each third are observed. Thus, for example, a stepwise change in the amount of component $p_3$) added per time unit is possible. Any desired number of steps in which the amount added is changed in each case can be selected. Thus, for example, it is possible to increase the amount added per time unit of component $p_3$) only at the beginning of the second and/or at the beginning of the third third. Within the third, the amount added per time unit remains then in each case constant. However, it is also possible to vary the amount of component added per time unit continuously, in accordance with the limiting case of an infinite number of steps.

It is assumed that addition of the components in the manner indicated promotes copolymerization and reduces homopolymerization of the individual components.

Preferred coating compositions are obtained if component (A1) and/or component (A2) contain tertiary amino groups. Accordingly, it is preferred to use polycondensation resins (A1) having an amine number from 5 to 20 mg of KOH/g and/or polyaddition resins (A2) having an amine number from 5 to 20 mg of KOH/g. The tertiary amino groups can be introduced into copolymer (A2) by the additional use of amino-containing monomers.

However, the hydroxyl-containing polyesters or alkyd resins or copolymers obtained can also additionally be reacted after the polymerization in a polymer-analogous reaction with compounds (V), which, apart from a tertiary amino group, additionally contain a group reactive toward the functional group of the copolymer. Compounds (V) which contain on average 0.8 to 1.5, preferably 1, free isocyanate groups per molecule are preferably used.

The reaction of copolymers (A2) with compounds (V) is carried out in a solvent which is inert to isocyanate, at temperatures from 10° to 100° C., preferably 50° to 80° C., if desired in the presence of organic tin compounds as catalysts, until an NCO value of virtually zero has been reached. The amount of compound (V) is chosen such that the resulting resin has the above-mentioned amine number.

Compounds (V) which are used for introducing a tertiary amino group into the binder are prepared by reacting diisocyanates or polyisocyanates with a less than stoichiometric amount of a tertiary amine. Suitable tertiary amines for this reaction are those of the general formula $NR_1R_2R_3$, in which $R_1$ is preferably an alkanol radical or another hydroxyl-containing radical and $R_2$ or $R_3$ can be alkyl or cycloalkyl radicals. Preference is given to dialkylalkanolamines, such as, for example, dimethylethanolamine, diethylethanolamine and higher homologs or isomers thereof. Examples of suitable di- or polyisocyanates are:

Aromatic isocyanates, such as, for example, 2,4-, 2,6-toluylene diisocyanate and mixtures thereof, 4,4′-diphenylmethane diisocyanate, m-phenylene diisocyanate, p-phenylene diisocyanate, 4,4-diphenyl diisocyanate, 1,5-naphthalene diisocyanate, 1,4-naphthalene diisocyanate, 4,4-toluidine diisocyanate, xylylene diisocyanate and substituted aromatic systems, such as, for example, dianisidine diisocyanates, 4,4-diphenyl ether diisocyanates or chlorodiphenylene diisocyanates and higher functional aromatic isocyanates, such as, for example, 1,3,5-triisocyanatobenzene, 4,4′,4″-triisocyanatotriphenylmethane, 2,4,6-triisocyantotoluene and 4,4′-diphenyldimethylmethane 2,2′, 5,5′-tetraisocyanate; cycloaliphatic isocyanates, such as, for example, 1,3-cylcopentane [sic] diisocyanate, 1,4-cyclohexane diisocyanate, 1,2-cyclohexane [lacuna] and isophorone diisocyanate; aliphatic isocyanates, such as, for example, trimethylene diisocyanate, tetramethylene diisocyanate, pentamethylene diisocyanate, hexamethylene diisocyanate, trimethylhexamethylene 1,6-diisocyanate and tris(hexamethylene) triisocyanate.

Diisocyanates having isocyanate groups of different reactivity, such as, for example, isophorone diisocyanate, are preferably used.

Components (A1) and (A2) are preferably used in the coating agents in such amounts that the binder component (A) has an acid number of at most 50 mg of KOH/g, preferably 5 to 20 mg of KOH/g, an OH number from 30 to 200 mg of KOH/g, preferably 50 to 150 mg of KOH/g and preferably an amine number from 0 to 20 mg of KOH/g, preferably 5 to 15 mg of KOH/g.

The polyisocyanates used as component (B) for crosslinking the hydroxyl-containing binders are the same polyisocyanates which are also used for preparing compound (V). Thus, for suitable examples see the description of compound (V). However, the polyisocyanates can furthermore also be linked to give prepolymers having a higher molecular weight. Of these, adducts of toluylene diisocyanate with trimethylolpropane, a biuret formed from 3 molecules of hexamethylene diisocyanate and trimers of hexamethylene diisocyanate and 3,5,5-trimethyl-1-isocyanato-3-isocyanatomethylcyclohexane may be mentioned.

The amount selected of the crosslinking agent used is such that the ratio of isocyanate groups of the crosslinking agent to hydroxyl groups of component (A) is in the range from 1:3 to 3:1.

Combinations with polyisocyanates or resins carrying isocyanate groups are rapidly crosslinked even at room temperature.

However, it is also possible to use the isocyanates described above, which have been reacted with conventional blocking agents, such as, for example, phenols, alcohols, acetoacetic esters, ketoxime and ε-caprolactam. These combinations are stable at room temperature and are in general only cured at temperatures above 100° C. In special cases, for example if acetoacetic esters are used for blocking, crosslinking can also take place even below 100° C.

The coating agents according to the invention contain one or more organic solvents as component (C). These solvents are usually used in amounts of 20 to 65% by weight, preferably 30 to 55% by weight, in each case relative to the total weight of the coating agent.

Examples of suitable solvents are the abovementioned compounds.

The coating agents according to the invention can furthermore contain customary auxiliaries and additives in the usual amounts, preferably 0.01 to 10% by weight, relative to the total weight of the coating agent (component D). Examples of suitable auxiliaries and additives are flow-improving agents, such as silicone oils, plasticizers, such as phosphoric esters and phthalic esters, viscosity-controlling additives, flatting agents, UV absorbers, light stabilizers and, if desired, fillers.

The coating agents are prepared from components (A) to (D) in a known manner by mixing and, if necessary, dispersing the individual components (A) to (D).

These coating agents can be applied to a substrate in the form of a film by spraying, flooding, dipping, roller application, knife application or brushing, after which the film is cured to give a firmly adhering coating.

The curing of these coating agents is usually carried out at room temperature or slightly elevated temperature, advantageously at temperatures below 100° C., preferably at temperatures below 80° C. However, the coating agents can also be cured under baking conditions, i.e. at temperatures of at least 100° C.

Suitable substrates are in particular metals and wood, plastic, glass, and the like.

Owing to the short curing times and low curing temperatures, the coating agents according to the invention are preferably used for automotive refinishing and the coating of large vehicles and truck superstructures. However, depending on the crosslinking agent used, they can also be used for automotive mass-production coating.

Furthermore, they are in particular suitable as clearcoat.

The coating agents according to the invention are distinguished in particular by a short drying time in combination with long processibility (pot life). Furthermore, the resulting coatings, in particular in the case of clearcoat coatings, have good mechanical properties, such as, for example, good stability of gloss, good filling power and good flow properties.

Below, the invention is illustrated in more detail by way of exemplary embodiments. All parts and percentages given are by weight, unless expressly stated otherwise.

1. Preparation of Polyesters 1 to 6

The raw materials listed in Table 1 are weighed into a 4 l stainless steel boiler equipped with stirrer, steam-heated column and water separator. After addition of 4% (relative to the weighed amount of polyester raw materials) of xylene as entrainer, the mixture is slowly heated (over a period of 5–7 hours) to 220° C. The water formed is distilled off azeotropically. After reaching an acid number of 12–14 mg of KOH/g, the mixture is partly dissolved with Shellsol ®A (a commercially available mixture of C3-C4-alkyl-substituted aromatics) to a nonvolatile content of 70%.

TABLE 1

| Polyester resin | Composition of polyesters 1 to 6 in mol | | | | | |
|---|---|---|---|---|---|---|
|  | 1 | 2 | 3 | 4 (C) | 5 | 6 (C) |
| PSA | 0.77 |  |  |  |  | 1.0 |
| 1,4-CHDA | 0.23 |  |  |  | 1.0 |  |
| THPSA |  | 1.0 |  |  |  |  |
| HHPSA |  |  | 1.0 |  |  |  |
| IPS |  |  |  | 1.0 |  |  |
| Trimethylolpropane | 1.08 | 1.08 | 1.08 | 1.18 | 1.2 | 1.07 |
| Isononanoic acid | 0.62 | 0.62 | 0.62 | 0.70 | 0.70 | 0.62 |
| Characteristic values: |  |  |  |  |  |  |
| Viscosity | 7.9 | 3.9 | 4.55 | 19 | 6.6 | 5.0 |
| Acid number | 14.7 | 14.3 | 13.8 | 12.3 | 10.3 | 12.0 |
| OH number | 107 | 107 | 106 | 130 | 140 | 100 |

(1,4-CHDA=1,4-cyclohexanedicarboxylic acid, HHPSA=hexahydrophthalic anhydride, THPSA=tetrahydrophthalic anhydride, IPS=isophthalic acid, PSA=phthalic anhydride, C=comparison)

OH number and acid number are given in mg of KOH/g; viscosity measured on a plate/cone viscometer at 23° C., given in dPa·s; amounts given in mol

2. Preparation of Copolymer Solutions 1 to 6

The preparation of the polyester-modified polyaddition resins is carried out in a 4 l stainless steel boiler equipped with stirrer, reflux condenser and feed inlets. The initial feeds are in each case the solutions of the polyester resins and variable amounts of a commercially available mixture of vinyl esters of saturated aliphatic monocarboxylic acids having predominantly 10 C atoms, which are branched at the α-C atom (commercial product VeoVa ® 10 from Shell), and the mixture is heated to 165° C.

Copolymer solution 1

The following are weighed into the boiler and mixed:
998.75 parts of polyester resin 5
118.32 parts of VeoVa ® 10
The following are weighed into the monomer feed and mixed:
236.64 parts of methyl methacrylate
236.64 parts of hydroxyethyl methacrylate
591.60 parts of styrene
The following are weighed into the initiator feed and mixed
36.0 parts of di-tert.-butyl peroxide
124.2 parts of Shellsol ®A The monomer mixture is metered in uniformly over a period of four hours and the initiator mixture over a period of five hours. During this addition, the temperature may drop to 160° C. After the initiator addition is complete, afterpolymerization of the mixture is allowed to continue at 160°–165° C. for another two hours. The copolymer solution thus obtained has a solids content of 83.6% (15 minutes at 180° C.) and a viscosity, measured as a 55% strength solution in butyl acetate, of 3.95 dPa·s. The polymer solution is then partly dissolved with xylene to a solids content of 70% and further dissolved with bytyl [sic] acetate to a solids content of 60%. The viscosity of the 60% strength solution is 9.1 dPa·s. Acrylate copolymer 1 has an OH number of 86 mg of KOH/g. The mixture has an acid number of 3.6 mg of KOH/g and an OH number of 105 mg of KOH/g.

Copolymer Solution 2

The preparation of copolymer solution 2 is carried out similarly to the preparation of copolymer solution 1. The amounts of polyester precursor and monomer mixture used and the amount of initiator remain the same relative to one another and are composed as follows:
The following are weighed into the boiler and mixed:
600.00 parts of polyester resin 1
63.00 parts of VeoVa ® 10
The following are weighed into the monomer feed and mixed:
126.00 parts of methyl methacrylate
126.00 parts of hydroxyethyl methacrylate
315.00 parts of styrene
The following are weighed into the initiator feed and mixed:
12.6 parts of di-tert.-butyl peroxide
85.60 parts of Shellsol ® A Copolymer solution 2 obtained analogously to the process of copolymer solution 1 has a solids content after polymerization (15 minutes at 180° C.) of 83.4% and a viscosity (measured as a 55% strength solution in butyl acetate, of 3.2 dPa·s. Analogously to copolymer 1, copolymer 2 is first diluted with xylene to a solids content of 70% and then with butyl acetate to a solids content of 60%. The original viscosity is 8.8 dPa.s. The acrylate copolymer has an OH number of 86 mg of KOH/g. The mixture has an acid number of 5.1 mg of KOH/g and an OH number of 95 mg of KOH/g.

Copolymer Solution 3

The preparation of copolymer solution 3 is carried out similarly to the preparation of copolymer solution 1. The amounts of polyester precursor and monomer mixture used and the amount of initiator remain the same relative to one another and have the following composition: The following are weighed into the boiler and mixed:
600.00 parts of polyester resin 2
63.00 parts of VeoVa ® 10
The following are weighed into the monomer feed and mixed:
126.00 parts of methyl methacrylate
126.00 parts of hydroxyethyl methacrylate
315.00 parts of styrene
The following are weighed into the initiator feed and mixed:
12.6 parts of di-tert.-butyl peroxide
85.60 parts of Shellsol ®A Copolymer solution 3 obtained analogously to the process of copolymer solution 1 has a solids content after polymerization (15 minutes at 180° C.) of 82.1% and a viscosity (measured as a 55% strength solution in butyl acetate, of 5.1 dPa·s. Analogously to copolymer 1, copolymer 3 is first diluted with xylene to a solids content of 70% and then with butyl acetate to a solids content of 60%. The original viscosity is 18.5 dPa·s. The acrylate copolymer 3 has an OH number of 86 mg of KOH/g. The mixture has an acid number of 5.83 mg of KOH/g and an OH number of 95 mg of KOH/g.

Copolymer solution 4

The preparation of copolymer solution 4 is carried out similarly to the preparation of copolymer solution 1. The amounts of polyester precursor and monomer mixture used and the amount of initiator remain the same relative to one another and have the following composition:
The following are weighed into the boiler and mixed:
600.00 parts of polyester resin 3
63.00 parts of VeoVa ® 10
The following are weighed into the monomer feed and mixed:
126.00 parts of methyl methacrylate
126.00 parts of hydroxyethyl methacrylate
315.00 parts of styrene
The following are weighed into the initiator feed and mixed:
12.6 parts of di-tert.-butyl peroxide
85.60 parts of Shellsol ®A Copolymer solution 4 obtained analogously to the process of copolymer solution 1 has a solids content after polymerization (15 minutes at 180° C.) of 83.5% and a viscosity (measured as a 55% strength solution in butyl acetate, of 2.3 dPa·s. Analogously to copolymer 1, copolymer 4 is first diluted with xylene to a solids content of 70% and then with butyl acetate to a solids content of 60%. The original viscosity is 6.05 dPa·s. The acrylate copolymer 4 has an OH number of 86 mg of KOH/g. The mixture has an OH number of 95 mg of KOH/g and an acid number of 6.50 mg of KOH/g.

Copolymer Solution 5 (comparison)

The preparation of copolymer solution 5 is carried out similarly to the preparation of copolymer solution 1. The amounts of polyester precursor and monomer mixture used and the amount of initiator remain the same relative to one another and have the following composition:

The following are weighed into the boiler and mixed:
600.00 parts of polyester resin 4
63.00 parts of VeoVa ® 10

The following are weighed into the monomer feed and mixed:
126.00 parts of methyl methacrylate
126.00 parts of hydroxyethyl methacrylate
315.00 parts of styrene The following are weighed into the initiator feed and mixed:
12.6 parts of di-tert.-butyl peroxide
85.60 parts of Shellsol ®A Copolymer solution 5 obtained analogously to the process of copolymer solution 1 has a solids content after polymerization (15 minutes at 180° C.) of 81.5% (where the solids content is measured, it is necessary to add xylene) and a viscosity (measured as a 55% strength solution in butyl acetate, of 4.6 dPa·s. Analogously to copolymer 1, copolymer 5 is first diluted with xylene to a solids content of 70% and then with butyl acetate to a solids content of 60%. The original viscosity is 14.0 dPa·s. The acrylate copolymer 5 has an OH number of 86 mg of KOH/g. The mixture has an acid number of 5.1 mg of KOH/g and an OH number of 105 mg of KOH/g.

Copolymer solution 6 (Comparison)

The preparation of copolymer solution 6 is carried out similarly to the preparation of copolymer solution 1. The amounts of polyester precursor and monomer mixture used and the amount of initiator remain the same relative to one another and have the following composition:

The following are weighed into the boiler and mixed:
600.00 parts of polyester resin 6
63.00 parts of VeoVa ® 10

The following are weighed into the monomer feed and mixed:
126.00 parts of methyl methacrylate
126.00 parts of hydroxyethyl methacrylate
315.00 parts of styrene The following are weighed into the initiator feed and mixed:
12.6 parts of di-tert.-butyl peroxide
85.60 parts of Shellsol ® A Copolymer solution 6 obtained analogously to the process of copolymer solution 1 has a solids content after polymerization (15 minutes at 180° C.) of 81.5% (where the solids content is measured, it is necessary to add xylene) and a viscosity (measured as a 55% strength solution in butyl acetate, of 3.5 dPa·s. Analogously to copolymer 1, copolymer 6 is first diluted with xylene to a solids content of 70% and then with butyl acetate to a solids content of 60%. The original viscosity is 9.0 dPa·s. The acrylate copolymer 6 has an OH number of 86 mg of KOH/g. The mixture has an acid number of 5.6 mg of KOH/g and an OH number of 92 mg of KOH/g.

3. Preparation of a Paint Reduction 1

Paint reduction 1 is prepared from the following components:
15 parts of xylene
13 parts of solvent naphtha
10 parts of a commercially available hydrocarbon mixture having a boiling range of 135°–185° C. and an aromatics content of about 16.5%
50 parts of butyl acetate
5 parts of 1-methoxypropyl 2-acetate
3 parts of butylglycol acetate
2 parts of 3-methoxybutyl acetate
2 parts of a commercially available mixture of monocyclic terpenes having a boiling range of 162°–182° C.

4. Preparation of a Curing Agent Solution 1

Curing agent solution 1 is prepared from the following components:
50.6 parts of trimerized hexamethylene diisocyanate, 90% strength solution in a 1:1 mixture of butyl acetate and solvent naphtha
10.8 parts of solvent naphtha
7.5 parts of xylene
1.5 parts of butyl acetate
14.0 parts of 1-methoxypropyl 2-acetate
11.0 parts of butylglycol acetate
4.0 parts of a 1% strength solution of dibutyltin dilaurate in a 1:1 mixture of xylene and butyl acetate
0.6 part of a commercially available silicone oil Examples 1 to 5 and Comparative Examples 1 to 3

Clearcoat solutions 1 to 8 are prepared from the components listed in Table 2 by mixing.

TABLE 2

Composition of clearcoats 1 to 8

| Paint No. | 1 | 2 | 3 (Comp.) | 4 (Comp.) | 5 | 6 | 7 (Comp.) | 8 |
|---|---|---|---|---|---|---|---|---|
| Butyl acetate 98/100 | 7.2 | 7.2 | 7.2 | 7.2 | 7.2 | 7.2 | 7.2 | 7.2 |
| Xylene | 3.8 | 3.8 | 3.8 | 3.8 | 3.8 | 3.8 | 3.8 | 3.8 |
| Solvent naphtha | 2.8 | 2.8 | 2.8 | 2.8 | 2.8 | 2.8 | 2.8 | 2.8 |
| Tinuvin ® 292 | 1.2 | 1.2 | 1.2 | 1.2 | 1.2 | 1.2 | 1.2 | 1.2 |
| Tinuvin ® 1130 | 1.0 | 1.0 | 1.0 | 1.0 | 1.0 | 1.0 | 1.0 | 1.0 |
| Copolymer solution 1 | 60.0 | 84.0 | | | | | | |
| Copolymer solution 2 | | | | | 84.0 | | | |
| Copolymer solution 3 | | | | | | 84.0 | | |
| Copolymer solution 4 | | | | | | | | 84.0 |
| Copolymer solution 5 | | | | | | | 84.0 | |
| Copolymer solution 6 | | | 84 | | | | | |
| Copolymer solution 7* | | | | 84 | | | | |

TABLE 2-continued

| | Composition of clearcoats 1 to 8 | | | | | | | |
|---|---|---|---|---|---|---|---|---|
| Paint No. | 1 | 2 | 3 (Comp.) | 4 (Comp.) | 5 | 6 | 7 (Comp.) | 8 |
| Copolymer solution 8* | | | | | | | | 24.0 |

*Copolymer solution 7 is Desmophen® A 365 from Bayer; copolymer solution 8 is a commercially available Cardura ® E 10 modified OH acrylate, which is used in automotive repair coatings (commercial product Macrynal ® SM 513 from Hoechst).

The clearcoat solutions are pre-diluted with paint reduction 1 and then brought to a viscosity, measured in the DIN 4 cup at 23° C., of 18 seconds with paint reduction 1. The paint solutions are then mixed with curing agent solution 1 in a mixing ratio of 2:1. In order to determine the pendulum hardness, coated glass panels are prepared from the paints by casting, and the films are baked at 60° C. for 30 minutes or left at room temperature for 24 hours. At a layer thickness of 20 μm (dry), the pendulum hardness of the film is then determined. For the other test procedures, the paint is applied to phospated and coated steel sheets. To this end, the phosphated steel sheets are coated with a commercially available 2-component polyurethane filler (OH components=polyester-modified hydroxyl-containing acrylate having an OH number of 90–110 mg of KOH/g; isocyanate component=hexamethylene diisocyanate trimerized via a biuret structure), dried overnight and then coated with a commercially available, conventional metallic base coat (dried by physical means, based on polyester resin, melamine resin, cellulose acetobutyrate, aluminum flakes). After a flash-off time of 30 minutes, the clearcoat is applied. The panels are immediately subjected to the tests described. The results are summarized in Tables 3 and 4.

3) Touch-dry:
About 20 minutes after having become dust-dry, the painted panel is covered with a sheet of paper about 3 cm$^2$ in size. A small rigid plastic sheet is placed on this paper, and then a 100 g weight is placed on top. After exactly 1 minute, as in the test for dust dryness, it is tested whether the paper still adheres. The time interval is as in the test for dust dryness.

Drying recorder:
The test is carried out by the following procedure. It was slightly modified compared with that of the drying recorder model 504 from Erichsen. Before the steel sheets are coated with the base coat, glass stripes, 25 mm wide and 30 cm long, are glued onto the particular test panel longitudinally. The test panels along with the glass stripes are then coated with the base coat and, after a flashoff time of 30 minutes, with the clearcoat. The glass stripes are removed and clamped into a special test device (drying recorder). By means of the drying recorder, a needle having a diameter of 1 mm is then moved across the coating for a period of 6 hours. This leads to the formation of three scratch traces, called phases, caused by

TABLE 3

| | Test results | | | | | | | |
|---|---|---|---|---|---|---|---|---|
| Paint No.: | 1 | 2 | 3 (Comp.) | 4 (Comp.) | 5 | 6 | 7 (Comp.) | 8 |
| Spray viscosity (s) | 18 | 18 | 18 | 18.5 | 18 | 18 | 18 | 17 |
| Original viscosity (s) | 36 | 46 | 47 | 90 | 51 | 75 | 60 | 33 |
| Additional dilution (parts) | 12 | 11.3 | 9.9 | 26Z | 12.1 | 18.1 | 12.8 | 8.62 |
| Viscosity as a function of time (DIN 4, in seconds) | | | | | | | | |
| Initial viscosity | 17 | 16.5 | 16 | 17 | 17 | 16.5 | 16.5 | 16 |
| after 60 minutes | 19 | 17.5 | 18 | 18.5 | 19 | 18 | 18 | 16.5 |
| after 120 mimutes | 20 | 19 | 21 | 21 | 20 | 19 | 20 | 18 |
| after 240 minutes | 23.5 | 24 | 27.5 | 31 | 26 | 22 | 21.5 | 21 |
| after 360 minutes | 33.5 | 44 | 60 | — | 43 | 36 | 95 | 36 |
| Pendulum hardness[1] | | | | | | | | |
| Room temperature | 65 | 64 | 64 | 59 | 63 | 74 | 78 | 76 |
| 30', 60° C. | 59 | 72 | 72 | 66 | 77 | 81 | 98 | 76 |
| Drying | | | | | | | | |
| Dust-dry[2] after: | 115' | 205' | 170' | 170' | 115' | 170' | 170' | 205' |
| Touch-dry[3] after: | >420' | >420' | 420' | 324' | >420' | 325' | 325' | >420' |
| Drying recorder[4] | | | | | | | | |
| 1st phase | — | — | — | — | — | — | — | — |
| 2nd phase | 65' | 85' | 145' | 50' | 130' | 90' | 110' | 155' |
| 3rd phase | 205' | 220' | 205' | 215' | 200' | 205' | 150' | 300' |

Explanations for Table 3 and Table 4:
1) Pendulum hardness according to König in s
2) Dust-dry: about 15 minutes after spraying on the paint, a small sample of seasand (3–4 g) is spread on a corner of the panel. The panel is then hit from a height of 30 cm with the edge against the ground (free fall). It is dust-dry if no sand adheres. The test is repeated after 15 minutes each time, and shortly before it becomes dust-dry the repetition interval is shortened to 5 minutes.

the drying of the coating. In the first phase, the needle penetrates to the glass, and the paint still coalesces. In the second phase, a clear scratch trace can be observed, and the paint no longer coalesces. In the third phase, the needle penetrates into the coating surface only very slightly and only leaves a trace which is barely visible. The middle of transition between two clearly definable phases is called phase transition.

The tests were carried out in each case at an ambient temperature of 26°-28° C.

We claim:

1. A coating agent based on hydroxyl-containing polycondensation and polyaddition products, comprising
   A) a hydroxyl-containing component (A) as binder,
   B) at least one polyisocyanate as crosslinking agent, and
   C) one or more organic solvents,
in which the components (A) and (B) are present in such amounts that the ratio of the number of free OH groups of component (A) to the number of isocyanate groups of component (B) is in the range from 1:3 to 3:1, in which
   I.) component (A) comprises
      A1) 5 to 80% by weight of at least one polyester and/or one alkyd resin (A1) having an OH number from 0 to 200 mg of KOH/g, an acid number from 0 to 200 mg of KOH/g and a number average molecular weight of between 500 and 10,000
      A2) 95 to 20% by weight of at least one polyaddition resin (A2) having an OH number from 30 to 250 mg of KOH/g, an acid number from 0 to 50 mg of KOH/g and a number average molecular weight of between 1,000 and 10,000,
      the sum of the weight proportions of components (A1) and (A2) being in each case 100% by weight and
   II.) component (A) is obtained from
      1.) at least one polyester and/or one alkyd resin (A1), which is obtained by reaction of
         a) polycarboxylic acids and/or esterifiable derivatives thereof and, optionally, monocarboxylic acids, 5 to 100 mol % of this carboxylic acid component being cycloaliphatic polycarboxylic acids and/or esterifiable derivatives thereof,
         b) polyols, optionally together with monools, and optionally, a component capable of reacting with the reaction produce from a) and b),
      2.) at least one polyaddition resin (A2), at least some of which has been prepared in the presence of component (A1) using from 5 to 30% by weight, based on the total weight of the monomers employed, of at least one vinyl ester of saturated aliphatic monocarboxylic acids having 9 to 11 carbon atoms which are branched at the α carbon atom, and
      3.) optionally, at least one further polyaddition and/or one further polycondensation resin.

2. A coating agent as claimed in claim 1, wherein component (A) comprises
   A1) 40 to 60% by weight of at least one polyester and/or one alkyd resin (A1) and
   A2) 60 to 40% by weight of at least one polyaddition resin (A2).

3. A coating agent as claimed in claim 2, wherein 30 to 100 mol % of cycloaliphatic polycarboxylic acids or esterifiable derivatives thereof have been used as component a) for preparing the polyester or alkyd resin (A1).

4. A coating agent as claimed in claim 1, wherein cyclohexane dicarboxylic acid and/or tetrahydrophthalic acid and/or hexahydrophthalic acid and/or alkyl-substituted derivatives thereof have been used as cycloaliphatic polycarboxylic acid (component a)) for preparing component (A1).

5. A coating agent as claimed in claim 1, wherein cyclohexane-1,4-dicarboxylic acid and isononanoic acid have been used as cycloaliphatic polycarboxylic acid (component a)) for preparing component (A1).

6. A coating agent as claimed in claim 1, wherein component (A2) has been prepared using from 5 to 20% by weight, based on the total weight of the monomers employed, of at least one vinyl ester of saturated aliphatic monocarboxylic acids having 9 to 11 carbon atoms which are branched at the α carbon atom.

7. A coating agent as claimed in claim 1, wherein polyesters and/or alkyd resins having an OH number from 30 to 150 mg of KOH/g and an acid number from 5 to 50 mg of KOH/g have been used as component (A1) and/or polyacrylates having an OH number from 50 to 180 mg of KOH/g and an acid number from 5 to 20 mg of KOH/g have been used as component (A2).

8. A coating agent as claimed in claim 7, wherein 40 to 80% by weight of component (A2) have been prepared in the presence of polyester (A1).

9. A coating agent as claimed in claim 1, wherein the polyester and/or alkyd resin (A1) and/or polyaddition resin (A2) contain tertiary amino groups.

10. A coating agent as claimed in claim 1, wherein the polyester and/or alkyd resin (A1) have an amine number from 5 to 20 mg of KOH/g and/or polyacrylate (A2) has an amine number from 5 to 20 mg of KOH/g.

11. A coating agent as claimed in claim 1, wherein binder (A) has an OH number from 30 to 200 mg of KOH/g and an acid number from 5 to 50 mg of KOH/g.

12. A coating agent as claimed in claim 1, wherein binder (A) has an OH number from 50 to 150 mg of KOH/g and an acid number from 5 to 20 mg of KOH/g.

13. A coating agent as claimed in claim 1, wherein component (A) has an OH number from 80 to 120 mg of KOH/g and an acid number from 5 to 20 mg of KOH/g, component (A1) having an acid number from 0 to 20 mg of KOH/g and component (A2) an acid number from 0 to 20 mg of KOH/g.

14. A process for the preparation of the coating agent as claimed in claim 1, which comprises mixing and, if necessary, dispersing a mixture comprising
   A) a hydroxyl-containing component (A) as binder,
   B) at least one polyisocyanate as crosslinking agent, and
   C) one or more organic solvents,
   D) optionally, conventional auxiliaries and additives,
in which components (A) and (B) are used in such amounts that the ratio of the number of free OH groups of component (A) to the number of isocyanate groups of component (B) is in the range from 1:3 to 3:1, in which
   I.) a component (A) is used which comprises
      A1) 5 to 80% by weight of at least one polyester and/or one alkyd resin (A1) having an OH number from 0 to 200 mg of KOH/g, an acid number from 0 to 200 mg of KOH/g and a number average molecular weight of between 500 and 10,000,
      A2) 95 to 20% by weight of at least one polyaddition resin (A2) having an OH number from 30 to 250 mg of KOH/g an acid number from 0 to 50 mg of KOH/g and a number average molecular weight of between 1,000 and 10,000,
      the sum of the weight proportions of components (A1) and (A2) being in each case 100% by weight and II.) component (A) is prepared by preparing resin (A1), by
1.) reaction of
   a) polycarboxylic acids and/or esterifiable derivatives thereof and, optionally, monocarboxylic acids, 5 to 100 mol % of this carboxylic acid component being cycloaliphatic polycarboxylic acids and/or esterifiable derivatives thereof,
   b) polyols, optionally together with monools, and optionally, a component capable of reacting with the reaction product from a) and b) and,
2.) by preparing at least one polyaddition resin (A2), at least some of which has been prepared in the presence of component (A1) obtained in the first process step, using from 5 to 30% by weight, based on the total weight of the monomers employed, of at least one vinyl ester of saturated aliphatic monocarboxylic acids having 9 to 11 carbon atoms which are branched at the α carbon atom and
3.) by adding any polyacrylate (A2) not prepared in the presence of polyester (A1) and, optionally at least one further polyaddition and/or polycondensation resin.

15. Use of the coating agent as claimed in claim 1 for the refinishing of automotive bodies and for the coating of large vehicles and the coating of truck superstructures.

16. Use of the coating agent as claimed in claim 1 as clearcoat.

17. The coating composition of claim 1, wherein the polyester and/or alkyd resin (A1) has a number average molecular weight of between 1,000 and 5,000 and the polyaddition resin (A2) has a number average molecular weight of between 1,500 and 6,000.

18. The process of claim 14, wherein the polyester and/or alkyd resin (A1) used therein, has a number average molecular weight of between 1,000 and 5,000 and the polyaddition resin (A2) used therein, has a number average molecular weight of between 1,500 and 6,000.

* * * * *